United States Patent [19]
Chen

[11] Patent Number: 5,691,847
[45] Date of Patent: Nov. 25, 1997

[54] ATHERMALIZED AND ACHROMATIZED OPTICAL SYSTEMS EMPLOYING DIFFRACTIVE OPTICAL ELEMENT

[75] Inventor: Chungte W. Chen, Irvine, Calif.

[73] Assignee: Hughes Aircraft Company, Los Angeles, Calif.

[21] Appl. No.: 285,540

[22] Filed: Aug. 8, 1994

[51] Int. Cl.$^6$ .............. G02B 27/44; G02B 9/04; G02B 9/14

[52] U.S. Cl. .......... 359/565; 359/566; 359/785; 359/793

[58] Field of Search .................. 359/565, 566, 359/785, 793

[56] References Cited

U.S. PATENT DOCUMENTS

| | | | |
|---|---|---|---|
| 5,044,706 | 9/1991 | Chen | 359/565 |
| 5,155,553 | 10/1992 | Chen | 359/565 |
| 5,229,880 | 7/1993 | Spencer et al. | 359/566 |
| 5,257,133 | 10/1993 | Chen | 359/566 |
| 5,268,790 | 12/1993 | Chen | 359/565 |
| 5,287,218 | 2/1994 | Chen | 359/565 |
| 5,436,763 | 7/1995 | Chen et al. | 359/565 |
| 5,442,480 | 8/1995 | Swanson et al. | 359/565 |
| 5,504,628 | 4/1996 | Borchard | 359/558 |

FOREIGN PATENT DOCUMENTS 000532267  3/1993  European Pat. Off. .......... 359/565

*Primary Examiner*—Scott J. Sugarman
*Attorney, Agent, or Firm*—Gordon R. Lindeen, III; Michael W. Sales; Wanda K. Denson-Low

[57] ABSTRACT

An athermalized and achromatized optical system (10, 30) has a lens group (12, 32) focusing energy on a focal plane (14, 42). The lens group (12, 32) includes at least two optical elements (22, 24, 26, 34, 36) of different material and a diffractive optical element (28, 40). The system (10, 30) enables athermalization and achromatization of the optical system.

13 Claims, 1 Drawing Sheet

ATHERMALIZED AND ACHROMATIZED OPTICAL SYSTEMS EMPLOYING DIFFRACTIVE OPTICAL ELEMENT

BACKGROUND OF THE INVENTION

1. Technical Field

This invention relates to athermalized and achromatized optical systems and, more particularly, to an athermalized and achromatized optical system, utilizing optical elements, and a method of constructing the same.

2. Discussion

Optical systems are generally effected by changes in temperature. The effective focal length and the back focal distance of an optical system generally decrease as temperature rises. As temperature varies, the image plane of the sensor moves as a result of changes in index of refraction and radii of the lenses. In the past, athermalization and achromatization of optical systems was generally corrected by mechanical devices, usually resulting in compromised image quality.

In the prior systems, the housing connecting the optics and the focal plane assembly is designed so that the image plane and the focal plane assembly move in tandem. This movement requires a housing with a negative thermal coefficient of expansion connecting the optics and the focal plane assembly. Consequently, the mechanical design is complicated and the unit cost is expensive.

Sensor athermalization and achromatization by optical systems has been explored previously, however, with little success. The difficulty associated with this design is the relative unavailability of adequate optical materials to permit simultaneous athermalization and achromatization of the sensor. If adequate materials and distribution of optical power among different lenses are selected properly, athermalization may be accomplished. However, this configuration results in a complicated optical system that generally produces poor image quality due to higher order chromatic aberration.

Thus, simultaneous athermalization and achromatization of an optical system through mechanical devices exhibits complicated problems and high cost. Previous optical systems suffer from poor image quality and lack adequate materials to permit simultaneous athermalization and achromatization. The present invention provides an optical system which overcomes the above short comings.

SUMMARY OF THE INVENTION

According to the teachings of the present invention, a system is provided which maintains favorable characteristics of athermalized and achromatized optical systems, while eliminating previous disadvantages. The present invention provides an optical system including refractive and diffractive optical elements. This system not only preserves the advantages of athermalized optical systems, such as operation in adverse environments with temperature ranges often exceeding ±30° C., but also has the advantage of achromatized optical systems such as excellent image quality.

The present invention combines conventional refractive materials and a diffractive optical element into an optical system which permits simultaneous athermalization and achromatization. Since the diffractive optical element is a very dispersive element with a negative Abbe number, it requires only a small amount of optical power for correction of chromatic aberration. The diffractive optical element permits the decoupling of the chromatic aberration problem from the thermal problem. This enables easy higher order chromatic aberration correction by the diffractive optical element.

In the preferred embodiment, the athermalized and achromatized optical system includes a lens group and a diffractive optical element focusing on a focal plane. The lens group and diffractive optical element receive and transmit energy, which energy ultimately passes through an exit pupil and is transmitted to a focal plane.

From the subsequent description and the appended claims taken in conjunction with the accompanying drawings, other objects and advantages of the present invention will become apparent to those skilled in the art.

DETAILED DESCRIPTION OF THE PREFERRED EMBODIMENT

Figure 1:
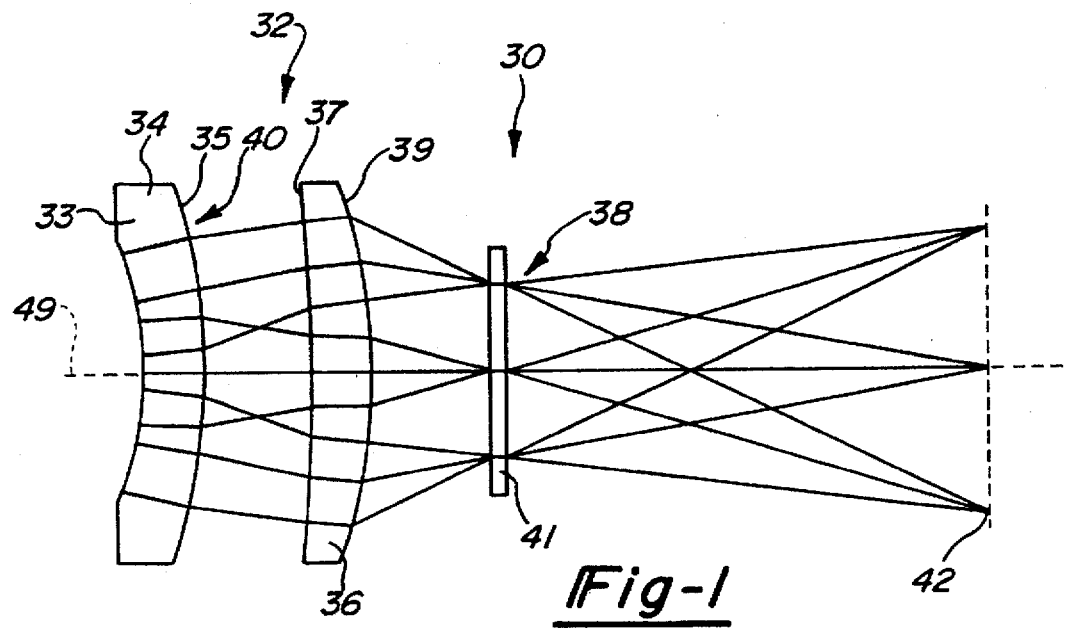
FIG. 1 is a diagrammatic side elevation view of an optical system in accordance with the teachings of the present invention.

Referring to FIG. 1, an optical system is shown and designated with the reference numeral 30. The system 30 includes a lens group 32 which focuses energy through a window 41 onto a focal plane 42. The lens group 32 includes a primary optical element 34 and a secondary optical element 36. Lens group 32 is positioned on optical axis 49, defined by primary optical element 34.

Generally, the primary optical element 34 is a negative power germanium lens and the secondary optical element 36 is a positive power silicon lens. Both optical elements 34 and 36 have a concave front 33, 37 and convex rear 35, 39 surface. Optical elements 34 and 36 have a predetermined radius of curvature on their front 33, 37 and rear 35, 39 surfaces as well as a predetermined thickness at their vertices. The front 33, 37 and rear 35, 39 surfaces also have predetermined aperture sizes.

An external exit pupil 38 is located on the rear surface of the window 41. The window 41 is located between the secondary optical element 36 and the focal plane 42.

A diffractive optical element 40 is located on the rear surface 35 of the primary optical element 34. The diffractive optical element 40 corrects chromatic aberration. To athermalize the lens, the effective focal length ratio between the primary optical element 34 and secondary optical element 36 must approximate the ratio of their respective thermal glass constants. This is determined as follows:

EQUATIONS (1) Total Optical Power:

$$\sum_{i=1}^{m} \phi_i = \phi_{total}$$

(2) Thermal Compensation:

$$\sum_{i=1}^{m} \gamma_i \phi_i = \alpha_t \phi_{total}$$

(3) Achromatism:

$$\sum_{i=1}^{m} \phi_i/\nu_i = 0$$

WHEREIN:

$\phi_i$=Optical Power $\gamma_i$=Thermal Glass Constant $\nu_i$=Abbe number of the lens $\alpha_i$=Coefficient of Thermal Expansion $\phi_{total}$=Total Optical Power (4) Thermal Glass Constant:

$$\gamma = -\frac{1}{f}\frac{df}{dT} = \frac{\beta}{(n-1)} - \alpha$$

WHEREIN:

f=Effective Focal Length

T=Temperature n=Index of Refraction $\beta$=Thermal Coefficient of Refraction $\alpha$=Coefficient of Thermal Expansion Generally, the lens group 32 and diffractive optical element 40 relay energy through the window 41 onto the focal plane 42. Also, a housing or holder (not shown) which spaces the lens is manufactured from titanium. The two lens and diffractive optical element optical system 30 in FIG. 1 is the simplest design which satisfies both the athermalization and achromatization conditions. Thus, the designer is free to choose adequate materials for thermal compensation.

The present system may be easily manufactured and is capable of improved athermalization control, high image quality, and is very compact and inexpensive. Additionally, the optical system is capable of wide field of view coverage with external exit pupil and secondary color correction. This is very important for many optical systems. Thus, optical sensors constructed according to the teachings of the present invention are compact, have better image quality, are capable of operation in adverse environments and are less expensive.

A specific prescription for an athermalized and achromatized optical system is given in the following table:

F/Number=2.8

Spectral Band=3.4 μm to 4.8 μm

Diffractive Optical Element Location=Rear surface of Germanium lens

Spacer Material=Titanium

It should be noted that the above prescription is an example for illustrative purposes and should not be construed in any way to limit the present invention.

Figure 2:
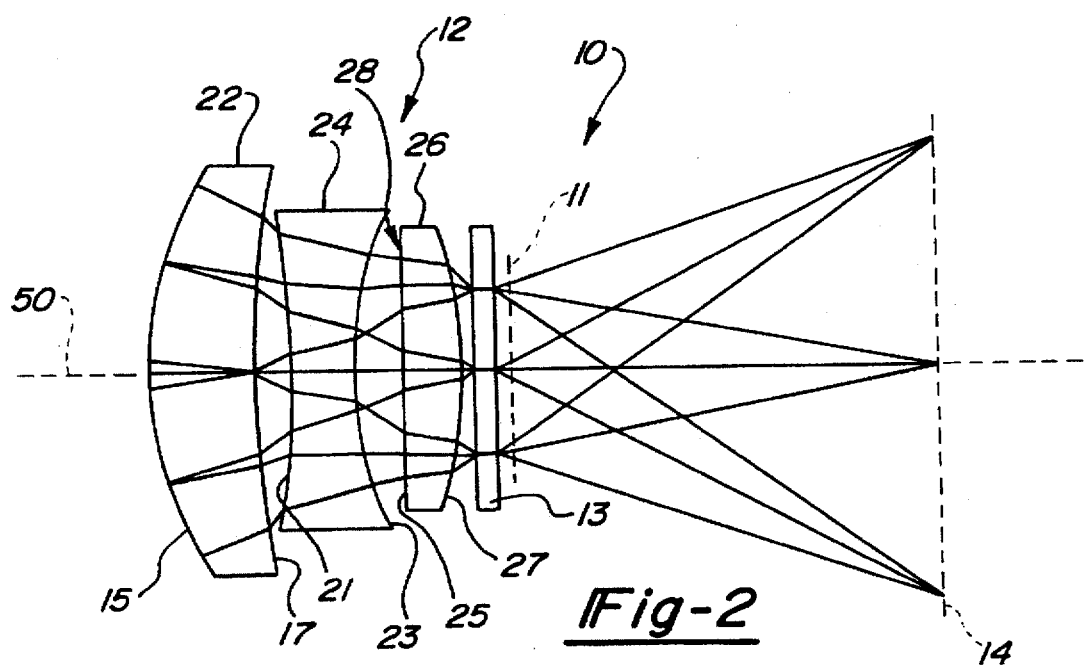
FIG. 2 is a diagrammatic side elevation view of an alternate embodiment of an optical system in accordance with the teachings of the present invention.

Referring to FIG. 2, an optical system is illustrated and designated with the reference numeral 10. The system 10 includes a lens group 12 focusing energy through a window 13 onto a focal plane 14. The lens group 12, commonly referred to as a Cook Triplet, includes three lenses. The primary optical element 22, secondary optical element 24 and tertiary optical element 26 of the group are generally positioned on an optical axis 50, which is defined by the primary optical element 22.

Generally, the primary optical element 22 is a positive power refractive optical lens formed from zinc selenite. The primary optical element 22 generally has a convex front 15 surface and a concave rear 17 surface. Primary optical element 22 has a predetermined radius of curvature on its front 15 and rear 17 surfaces as well as a predetermined thickness at its vertex and predetermined aperture sizes on its front 15 and rear 17 surfaces. The primary optical element 22 is positioned on the optical axis 50.

The secondary optical element 24 is a negative power refractive optical lens. Generally, the secondary element 24 has a biconcave configuration formed from zinc sulfide. The secondary optical element 24 has a predetermined radius of curvature on its front 21 and rear 23 surfaces as well as a predetermined thickness at its vertex and predetermined aperture sizes on its front 21 and rear 23 surfaces. Secondary optical element 24 is positioned on the optical axis 50.

The tertiary optical element 26 is a positive power refractive optical lens. The tertiary optical element 26 is centered with respect to the optical axis 50. Generally, tertiary optical element 26 has a double convex configuration formed from arsenic trisulfide nitride and has a predetermined radius of curvature on its front 25 and rear 27 surface as well as a predetermined thickness at its vertex and predetermined aperture sizes on its front 25 and rear 27 surface.

An external exit pupil 11 is located between the window 13 and the focal plane 14. The diffractive optical element 28 is secured to the front 25 convex surface of the tertiary optical element 26. The diffractive optical element 28 of the tertiary optical element 26 is generally a Kinoform type. The diffractive optical element 28 corrects the residual chromatic

TABLE 1

| ELEMENT NUMBER | RADIUS OF CURVATURE | THICKNESS | MATERIAL AND POWER |
| --- | --- | --- | --- |
| Front 33 | −0.86153 | | |
| Lens 34 | | 0.1642 | −Germanium |
| Rear 35 | −1.32619 (see Note 1) | | |
| DOE 40 | (see Note 2) | | |
| Air | | 0.2918 | |
| Front 37 | −4.44652 | | |
| Lens 36 | | 0.1642 | +Silicon |
| Rear 39 | −1.39789 | | |
| Air | | 0.3086 | |
| Window 41 | | 0.0400 | Germanium |

Note 1 - Rear surface 35 is aspheric with
4th order coefficient = 0.12805
6th order coefficient = 0.33196
8th order coefficient = 0.22266E-1
Note 2 - DOE phase profile function $f(\rho)$ is $f(\rho) = 35.6476 \rho^2 - 500.627 \rho^4 + 3389.36 \rho^6 - 7885.82 \rho^8$
Here, $\rho$ is the radial coordinate

CHARACTERISTICS

Effective Focal Length=1.1 inches

Field of View=40° aberration and the higher order chromatic aberration. Also, a housing or holder (not shown) which spaces the lens is manufactured from aluminum.

A specific prescription for an athermalized and achromatized optical system is given in the following table:

TABLE 2

| ELEMENT NUMBER | RADIUS OF CURVATURE | THICKNESS | MATERIAL AND POWER |
|---|---|---|---|
| Front 15 | 0.680294 | | |
| Lens 22 | | 0.180 | +ZnSe |
| Rear 17 | 1.93209 | | |
| Air | | 0.060 | |
| Front 21 | −1.58490 | | |
| Lens 24 | | 0.110 | −ZnS |
| Rear 23 | 0.68384 | | |
| Air | | 0.8503E-1 | |
| DOE 28 | (see Note 1) | | |
| Front 25 | 13.0193 (see Note 2) | | |
| Lens 26 | | 0.100 | +As2S3N |
| Rear 27 | −0.861502 | | |
| Air | | | |
| Window 13 | | 0.04 | Germanium |

Note 1 - DOE phase profile is $f(\rho) = -2.96396\rho^2$ Here, $\rho$ is the radial coordinate
Note 2 - Front 25 surface is an aspheric surface with
4th order coefficient = 0.13303
6th order coefficient = 2.2311

CHARACTERISTICS

Diffractive Optical Element Location=Front surface of Arsenic Trisulfide Nitride Lens Spacer Material=Aluminum It should be noted that the above prescription is an example for illustrative purposes and should not be construed in any way to limit the present invention.

Generally, the lens group 12 relays energy through the window 13 onto the focal plane 14. Athermalization with three different lens materials minimizes the optical power required of each lens. The diffractive optical element 28 corrects the residual chromatic aberration and the higher order chromatic aberration. The combination of two or more different types of refractive materials and a DOE also made it possible for secondary color correction.

An advantage of the present invention is its compact size. The present invention may be utilized in military and commercial electro-optic sensors. The present invention provides a sensor that is substantially unaffected by temperature changes as well as a sensor that produces a high quality image.

While it will be apparent that the preferred embodiment is well calculated to fill the above-stated objects, it will also be appreciated that the present invention is susceptible to modification, variation, alteration and change without varying from the proper scope and fair meaning of the subjoined claims.

What is claimed is:

1. A method of simultaneously athermalizing and achromatizing an optical system, said method comprising the steps of:
   (a) providing an optical system;
   (b) assembling a lens group of at least three lenses of different materials, said materials having different thermal glass constants;
   (c) securing a diffractive optical element to one of the lenses in said lens group, wherein said diffractive optical element further comprises means for correcting chromatic aberration, said diffractive optical element associated with one of said first, second or third lenses, wherein an effective focal length ratio between said first lens and said second lens approximates a ratio of their respective first and second thermal glass constants said lenses and diffractive optical elements generally positioned on an optical axis defined by said first lens providing a compact system being simultaneously athermalized and achromatized; and
   (d) positioning said lens group and said diffractive optical element to focus energy onto a focal plane within said optical system.

2. The method according to claim 1 wherein said lens group includes first and second lenses, and wherein said second lens is positioned between said first lens and said focal plane.

3. The method according to claim 2 wherein said first lens is germanium.

4. The method according to claim 2 wherein said second lens is silicon.

5. The method according to claim 2 wherein a flat correcting lens is positioned between said second lens and said focal plane.

6. The method according to claim 2 wherein the diffractive optical element is attached to a rear surface of said first lens.

7. The method according to claim 2, said lens group further including:
   a third positive power lens, wherein said third lens is positioned to receive energy transmitted from said second lens, said first, second and third lenses focusing energy on the focal plane.

8. The method according to claim 7 wherein said first lens is made of zinc selenite.

9. The method according to claim 7 wherein said second lens is made of zinc sulfide.

10. The method according to claim 7 wherein said third lens is made of arsenic trisulfide nitride.

11. The method according to claim 7 wherein said second lens is positioned between said first and third lens.

12. The method according to claim 7 wherein a flat correcting lens is positioned between said third lens and said focal plane.

13. The method according to claim 7 wherein said diffractive optical element is attached to a first surface of said third lens.

\* \* \* \* \*